United States Patent [19]
Schaller et al.

[11] 3,907,412
[45] Sept. 23, 1975

[54] FILM PROJECTOR WITH SOUND

[75] Inventors: Hans Achim Schaller; Gunter Reinhardt, both of Nuremberg; Dieter Zenger, Schwabach, all of Germany

[73] Assignee: Ernst Plank KG, Nuremberg, Germany

[22] Filed: Oct. 29, 1974

[21] Appl. No.: 518,608

[30] Foreign Application Priority Data
Oct. 30, 1973 Germany............................ 2354286

[52] U.S. Cl................................. 352/11; 352/5
[51] Int. Cl.²........................................ G03B 31/00
[58] Field of Search................. 352/5, 6, 7, 8, 9, 10, 352/11

[56] References Cited
UNITED STATES PATENTS
1,989,963   2/1935   Baker........................................ 352/6
3,049,965   8/1962   Gunst...................................... 352/5

*Primary Examiner*—Monroe H. Hayes
*Attorney, Agent, or Firm*—Toren, McGeady and Stanger

[57] ABSTRACT

A film projector is provided with means for simultaneous playback of at least two sound tracks whereby the volume or intensity of one of the sound tracks is applied to control the volume or intensity of the other sound track without causing partial or complete erasure of the recorded sound. The volume or intensity of one of the sound tracks may be varied inversely to the volume of the other sound track thereby permitting two separate acoustical information patterns recorded on the tracks to be simultaneously heard while one or the other of the tracks is softened or decreased in volume intensity when the concurrently played track is to have its volume heightened.

12 Claims, 4 Drawing Figures

FILM PROJECTOR WITH SOUND

BACKGROUND OF THE INVENTION

The present invention is generally related to film projector apparatus with sound reproduction means and more particularly to a projector wherein, during showing of a film, simultaneous sound reproduction of at least two separate sound tracks containing different acoustical information may be provided in a controlled manner.

In film used with projectors of the type to which the present invention relates, which projectors operate according to the so called German "Pisten procedure", the film is provided with sound on a sound track which is arranged directly on the film strip. In other words, during exposure or shooting of the film, sound in the form of music or speech is recorded on a sound track arranged directly adjacent or contiguous to the film strip containing the visual image. This sound or acoustical information is reproduced during showing of the developed film by the projector. In prior art systems of this type, the procedure involved in showing the film provides the advantage of absolute syncronism between the acoustical sound and the visual images which are reproduced.

However, it has been found that certain limitations arise with regard to the quality of the sound which can be obtained in this manner. For example, if the requirement should arise for adding subsequent acoustical information to the first acoustical sound track which has been recorded, this addition of a subsequent sound track is rendered difficult primarily because of the aforementioned poor sound quality. Such a problem would arise when, for example, accompanying background music is to be added to a first sound track comprising speech or other similar type of acoustical information. When a second sound track containing a different type of acoustical information of the kind referred to is to be added, this can only be accomplished in a manner which necessitates partial erasure of the first acoustical information. As a result of such partial erasure, the erased portions or sections of the first acoustical track are lost forever and cannot be restored.

Accordingly, it becomes impossible to syncronize the second acoustical track on a trial basis with the first acoustical track, since repeated syncronization attempts will cause corresponding erasure of portions or areas of the first sound track and, as a consequence, the first acoustical track would become unusable. Moreover, the relatively low frequency range involved becomes further decreased by the partial erasure.

Accordingly, the purpose of the present invention is to provide a projector of the type here in referred to wherein there may be obtained a combination of a first and a second acoustical information track while overcoming the aforementioned disadvantages of the prior art. Particularly, it is an object of the invention to enable such sound recording and playback while avoiding partial erasure of the recorded acoustical information. It is also an aim of the invention to provide means for playback of both acoustical tracks in a combined or associated manner which may be readily heard and perceived by a listener. The system of the invention is intended to provide an arrangement which can be produced with relatively simple and inexpensive means whereby projectors arranged in accordance with present invention may be primarily adaptable for use by amateurs or nonprofessionals.

SUMMARY OF THE INVENTION

Briefly, the present invention may be described as an improvement for a projector assembly adapted to project a visual filmed image simultaneously with reproduction of acoustical information recorded on sound track means, said improvement comprising means for simultaneously reproducing at least two separate acoustical information patterns recorded on at least two separate sound tracks, means for amplifying said at least two information patterns, and means for controlling the volume level at which one of said at least two information patterns is reproduced in dependence upon the volume level at which the other of said at least two information patterns is reproduced while said patterns are being simultaneously reproduced by the projector apparatus.

In one application of the present invention, the projector may be provided with or coupled to a sound tape or tape recording device whose sound tape comprises a second acoustical information track with means being provided for amplification of both acoustical information tracks. Thus, when both acoustical tracks occur or are reproduced simultaneously, the intensity or volume of the sound of one of the tracks, preferably of the second track, is reduced by the other acoustical track, preferably the first track. Projectors which are provided with a sound tape or tape recording device or which are coupled with such a device, are known per se. By the inventive combination of the present invention, a correlation or combination of two acoustical tracks is achieved in such a manner that erasure or extinction of the tracks is prevented so that both tracks on their respective sound carriers will be completely and fully retained. The goal of the invention is obtained by combining two acoustical information carriers of the indicated type and by a reduction of the sound volume of the information to be controlled by a controlling information pattern. Thus, for example, noise, speech or other similar type of acoustical information which has been recorded on a first information carrier, which may be the sound track applied directly upon the film strip during shooting of the strip, may be reinforced, supported or augmented by a second acoustical information pattern, which may be music or the like which has been recorded on a second information carrier such as a sound tape.

The control may be accomplished in such a manner that a predetermined sound volume or intensity of the first acoustical track, e.g. a speech track, may operate to control the second acoustical track, e.g. music, which will be heard with a lower or softer sound volume. However, the reverse type of control is also feasible with the present invention whereby there may be accomplished a reduction of the sound volume of the first information track, which has been recorded on the sound carrier, by the acoustical information track of the second carrier, i.e. the sound tape.

It is to be understood that the term "acoustical information" as used herein is intended to encompass any possible type of acoustical information such as noise, speech, music or the like.

It is an important feature of the present invention that there is avoided any reduction in the quality of both the controlled acoustical information track as well as the controlling acoustical information track. Particularly, erasure or extinction of the recorded information is prevented.

In accordance with a preferred embodiment of the present invention, a cassette device is utilized as the sound tape means which is built into the projector with the drive of this sound tape device being accomplished by the drive of the projector through resilient intermediate elements. Such projectors are known, per se. However, they are particularly suitable for carrying out the purposes and objects of the present invention. In this connection, it should be realized that such projectors are usually inexpensive and that the speaker which is provided in such projectors may be used for reproducing or playing a mixture of both acoustical information patterns. Thus, the improvements of the present invention and the operating precedures involved whereby a combination of both information tracks can be satisfactorily acoustically percieved may be combined in a single device whose production costs are relatively small.

As has been previously stated, the present invention is essentially directed to a device wherein at least two sound tracks are present. Of these two sound tracks, at least one track is usually provided directly upon the film strip. The second track may, however, also be provided directly on the film strip. The sound tracks are usually always present along the edge of the film strip. In the event that still a third or further sound track is required, then a tape recorder may be coupled with a projector whose sound tape carries the additional sound tracks and which may be operated syncronously with the film strip.

However, if only a single sound track is provided on the film strip, then there must be provided a tape recorder or sound tape device which is coupled to or built into the projector in order to accomodate on the tape of this device the second sound track. If desired, this sound tape can carry a third additional sound track.

The various features of novelty which characterize the invention are pointed out with particularity in the claims annexed to and forming a part of this specification. For a better understanding of the invention, its operating advantages and specific objects attained by its use, reference should be had to the accompanying drawings and descriptive matter in which there are illustrated and described preferred embodiments of the invention.

DESCRIPTION OF THE PREFERRED EMBODIMENTS

Figure 1:
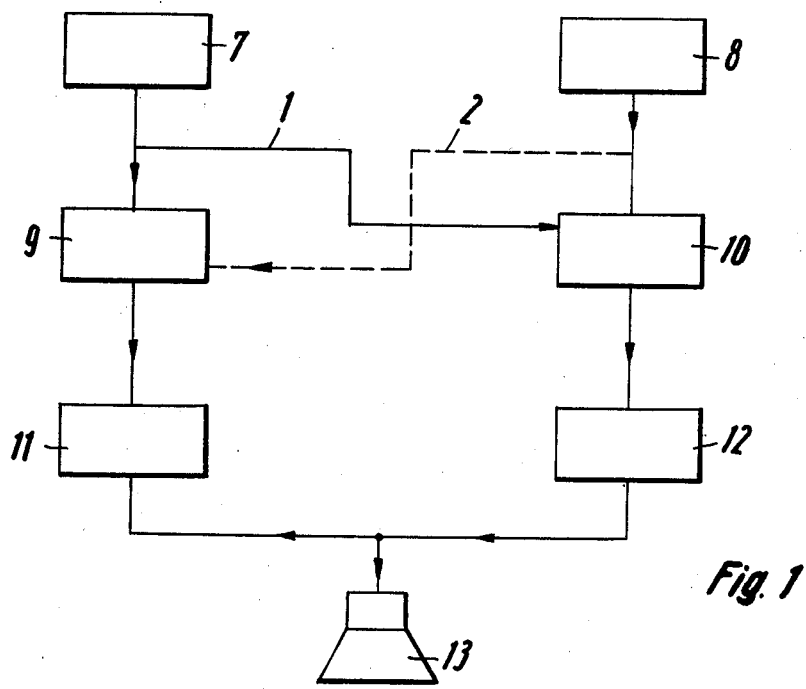
FIG. 1 is a schematic illustration of a system in accordance with a first embodiment of the present invention.
Figure 2:
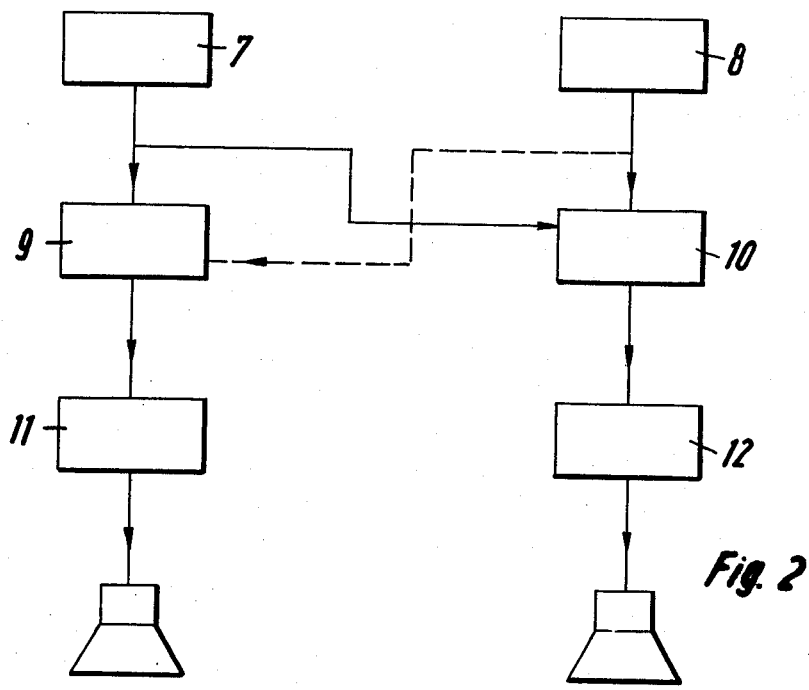
FIG. 2 is a schematic illustration of a second embodiment of the invention.

In the schematic or diagramatic illustrations of FIGS. 1 and 2, there is shown a system according to the present invention which comprises a first information track carrier 7 which has applied thereupon the sound track recorded upon the film strip and which is diagramatically illustrated as including a sound playback head associated therewith. A second information track carrier 8 which may be a sound tape or tape recording device having a playback sound head incorporated therein is coupled with the projector or, preferably, is built directly into the projector in the form of a cassette tape recorder whose sound tape carries the second acoustical information track.

The two sound heads of the information carriers 7 and 8 convey the acoustical information, respectively, to a pair of preamplifiers 9 and 10. These preamplifiers are, respectively, connected to final amplifiers 11 and 12 which are constructed and arranged, in the same manner as the preamplifiers 9 and 10, in accordance with conventional principles within the knowledge of those skilled in the art.

The system includes a connection 1 between the information carrier 7 and the preamplifier 10. This connection and the switching of the preamplifier 10 are accomplished in such a manner that, with an acoustical information pattern having a predetermined sound intensity or volume being emitted from the information carrier 7 into the preamplifier 10, there occurs a reduction in the sound intensity of the information pattern received as an output from the information carrier 8.

Furthermore, not only is it possible with the present invention to control the volume of the acoustical information emitted from the information carrier 8 in accordance with or in dependence upon the sound volume emitted from the information carrier 7, but the reverse arrangement is also feasible. That is, there may be effected a reduction of the sound intensity in the preamplifier 7 when there occurs an acoustical information pattern of a predetermined sound intensity at the information carrier 8. In such case, however, the associated connection is made in accordance with a connection labeled 2 shown in dotted line in the drawing of FIG. 1. In this manner, an acoustical occurance which has been recorded on the information carrier 8 may be commented upon by textual material which has been recorded as verbal information upon the information carrier 7 with the result that whenever the verbal or speech patterns recorded upon the information carrier 8 are reproduced, the sound intensity of the noise of the information carrier 7 will be decreased.

Thus, it will be apparent that at least two separate acoustical information patterns may be reproduced with the volume of one of the acoustical information patterns, i.e. the sound emitted from the carrier 7, being applied as a control function operating to control the volume or sound intensity of the other information pattern, i.e. the sound emitted from the carrier 8. Additionally, the reverse type of operation is also possible.

Figure 3:
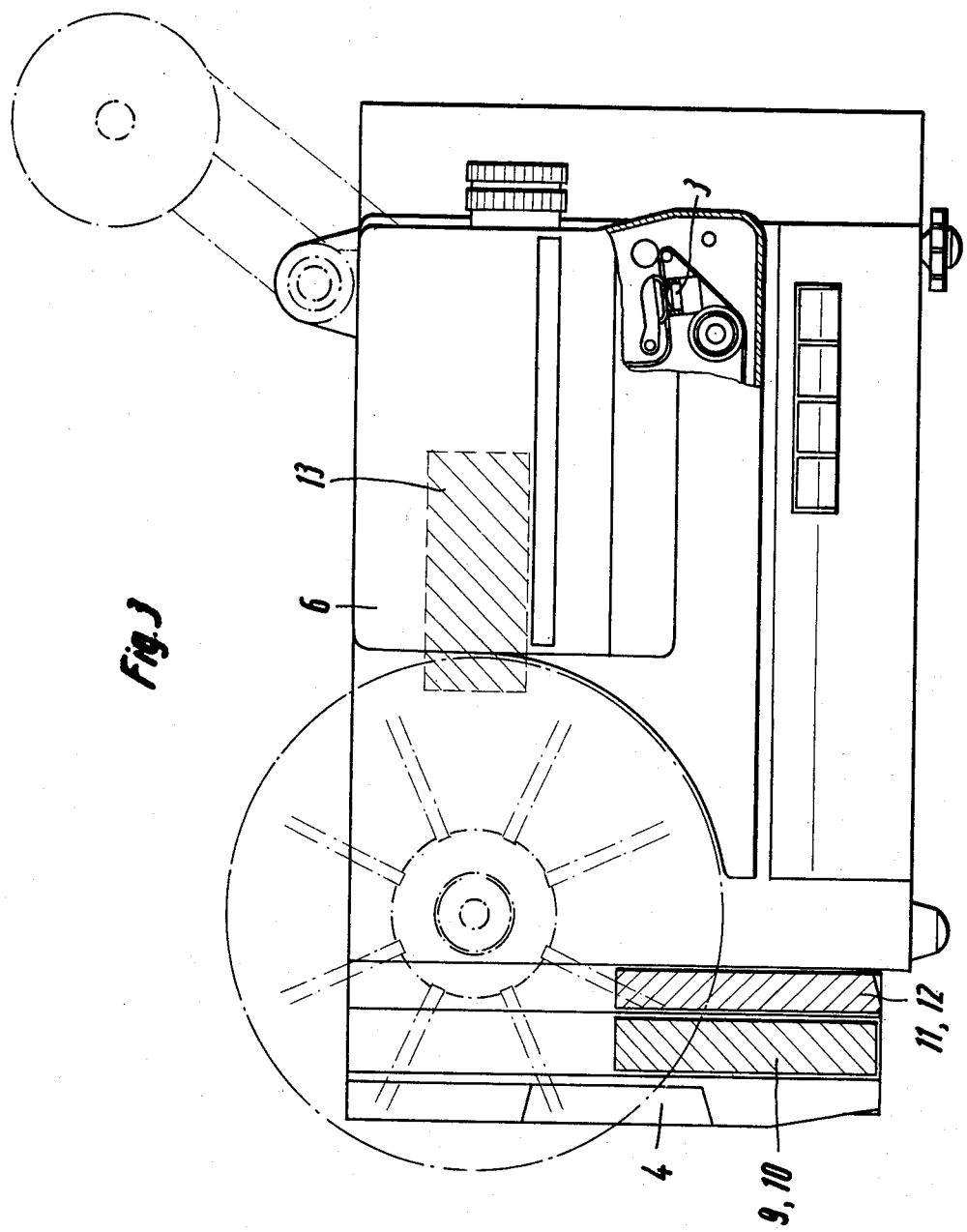
FIG. 3 is a side view of a projector according to the invention with various operating components thereof being diagramatically illustrated.

In FIG. 3, there is diagrammatically shown in lateral elevation a projector 6 having a sound head 3, a cassette tape recorder 4, a first preamplifier 9, a second preamplifier 10, a pair of final amplifiers 11 and 12, and a speaker 5. The projector 6 of FIG. 3 may be arranged in accordance with the system depicted in FIG. 1, wherein a single speaker 5 is utilized with both sound tracks being applied as an input thereto, or it may be arranged in accordance with the illustration of FIG. 2 wherein a pair of separate speakers 5a and 5b are provided with each of the sound tracks being individually applied, respectively, to each of the speakers separately.

Figure 4:
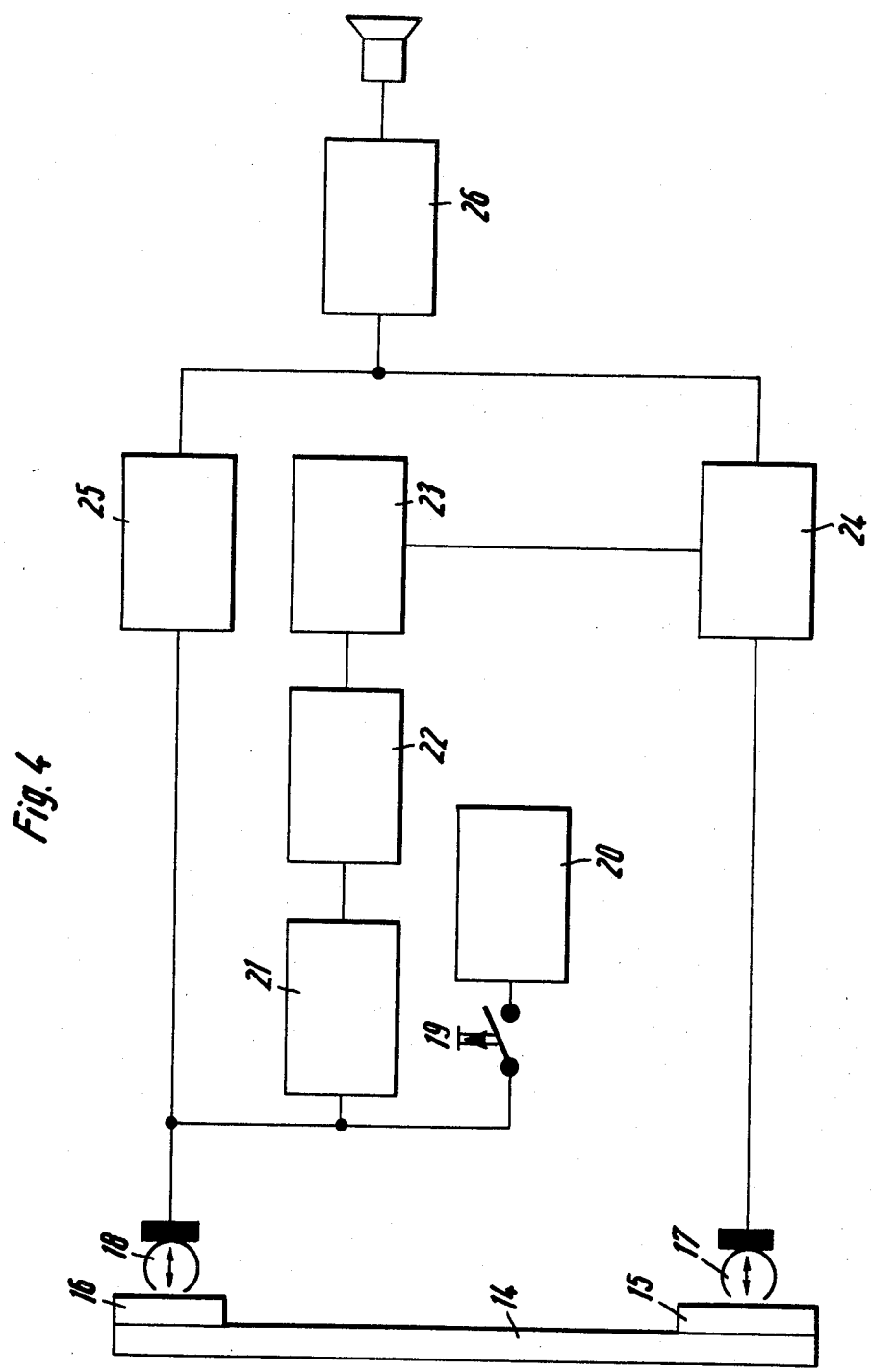
FIG. 4 is a schematic illustration of a further embodiment of the invention.

By a further embodiment of the invention, as depicted in FIG. 4, a film strip 14 shown in an enlarged cross sectional illustration, has applied or provided thereon a first magnetic sound track 15 and a second magnetic sound track 16. The system is provided with means 17 and 18 conforming to or fitting the edge-like sound tracks recorded on the film for recording and playback of the sound track. These elements may be so called sound heads. By means of an operating member or element 19 which, for example, may be a switch provided at a microphone, a controlling sound may be provided upon the track 16, which sound is produced by a generator 20. This controlling sound has a frequency which is outside the frequency of the acoustical information track which is applied upon the track 15 and which may, for example, be speech or music. The control signals of other frequency serve the purpose of reducing the sound intensity of the first sound track 15 and, if necessary, of completely suppressing this information whereby it becomes inaudible. This is accomplished in the present embodiment of the invention in such a manner that a selective amplifier 21 is made responsive only to the frequency of the control signals or the control sound of the tracks 16 which are amplified. A threshold stage 22 is connected to receive the output of the selective amplifier 21 with the threshold stage 22, upon reaching a predetermined lower limit value of the controlled signals, transmitting these signals to a damping or attenuation member 23 which is connected to an ultimate amplifier 24 and which thus reduces the acoustical information on the sound track 15 or makes this acoustical information inaudible.

A main amplifier 25 for the acoustical information track 16 is also provided while a common amplifier 26 connected to an output speaker element 28 is arranged as shown.

In the operation of the device, the sound track 15 is provided with a musical recording. The music which is recorded is to be augmented with spoken or verbal material. By pressing the operating member 19 shortly before the commencement of the recording process, the operator may thereafter record a verbal control sound pattern on the track 16. When this speech is terminated, the operating member 19 is released and during the subsequent reproduction or playback, the effect which is obtained is such that during the reproduction of the spoken text the music will be damped, suppressed or otherwise rendered completely inaudible in correspondence with the adjustment or setting of a potentiometer (not shown).

It is also possible to operate the device in such a manner that when the operating member or actuator 19 is pressed there may be applied for a certain period of time a control sound pattern onto the track 16 which does not otherwise supply the track 16 with additional sound information. This may be done if, for any reason, the sound information on the track 16 is to be weakened for this time period or is to be otherwise rendered completely inaudible. As previously stated, the reduction or complete suppression of one acoustical information pattern by means of the other information pattern is also enabled without such a control sound pattern which is switched in or switched out (off) by the operator. However, by means of the arrangement of FIG. 4, the operation may be made considerably simpler and thus also exert a positive influence on the resulting sound.

While specific embodiments of the invention have been shown and described in detail to illustrate the application of the inventive principles, it will be understood that the invention may be embodied otherwise without departing from such principles.

What is claimed is:

1. In a projector assembly for projecting a visual filmed image and simultaneously reproducing sound recorded on sound track means, the improvement comprising means for simultaneously reproducing at least two separate acoustical information patterns recorded on at least two separate sound tracks, means for amplifying said at least two information patterns, and means for controlling the volume level at which one of said at least two information patterns is reproduced in dependence upon the volume level at which said other of said patterns is reproduced while said patterns are being simultaneously reproduced by said projector apparatus.

2. An assembly according to claim 1 wherein said volume level controlling means operate to alter the volume level of said one information pattern inversely to changes in volume level occuring in said other information pattern.

3. An assembly according to claim 1 wherein said projector is provided with a sound tape device including sound tape having thereon an acoustical information pattern, said projector being adapted to project said visible filmed image by movement through said projector of a film strip, with the movement of said film strip being syncronized with the movement of the sound tape of said sound tape device.

4. An assembly according to claim 3 wherein said sound tape device is a cassette device which is built into said projector, said projector including drive means operable to simultaneously drive said projector and said cassette device through resilient intermediate elements.

5. An assembly according to claim 1 wherein said projector is adapted to project said visual filmed image from a film strip passing therethrough, wherein two sound tracks are applied laterally along said film strip and wherein said projector is provided with means for magnetic track recording at the edges of said film strip and with means for playback which are adapted to conform to the sound tracks thus recorded.

6. An assembly according to claim 1 wherein each of said acoustical information patterns is applied to a preamplifier, with one of said information patterns operating as a controlling pattern and with the other of said information patterns being a controlled pattern, said assembly further including a control connection extending from the preamplifier of said controlling pattern to the preamplifier of said controlled pattern.

7. An assembly according to claim 6 including a pair of amplifiers each arranged to receive, respectively, a signal from each of said preamplifiers and a common speaker connected to receive signals simultaneously from both of said amplifiers.

8. An assembly according to claim 1 wherein the information pattern of one of said sound tracks is influenced with respect to its intensity by control signals from the other of said sound tracks.

9. An assembly according to claim 8 wherein the controlling information pattern comprises a frequency which is outside of the utilized transmission range.

10. An assembly according to claim 9 including a microphone and an operating member adaptable to effect actuation of said microphone wherein the controlling sound is set by means of said operating member.

11. An assembly according to claim 10 including a main amplifier adapted to receive said controlled sound pattern, and a control circuit adapted to have applied thereto said controlling sound pattern, said control circuit including a selective amplifier, a threshold stage connected to said selective amplifier and an attenuation member controlled by said threshold stage, said attenuation member being connected to control said main amplifier of said controlled sound pattern.

12. An assembly according to claim 11 wherein said projector is assembled as a unitary member having built thereinto said preamplifiers, said amplifiers, said selective amplifier, said threshold stage, said attenuation member and speaker means all connected with each other and wherein said projector further includes sound heads including sound recording means as well as playback means, said assembly being arranged to have sound tracks operatively passed therethrough in operative association with said sound heads.

\* \* \* \* \*